United States Patent [19]
Hill et al.

[11] Patent Number: 5,469,943
[45] Date of Patent: Nov. 28, 1995

[54] BRAKE ASSEMBLY HAVING A DUMP VALVE

[75] Inventors: John H. Hill, Edelstein; Randall L. Mooberry; Daniel J. Schartman, both of East Peoria, all of Ill.

[73] Assignee: Caterpillar Inc., Peoria, Ill.

[21] Appl. No.: 432,699

[22] Filed: Apr. 28, 1995

[51] Int. Cl.⁶ .................................................. F16D 65/813
[52] U.S. Cl. .................. 188/264 F; 188/264 D; 188/71.6; 192/113.35
[58] Field of Search .................... 188/71.4, 71.5, 188/71.6, 72.4, 151 R, 106 F, 170, 264 B, 264 CC, 264 D, 264 E, 264 F; 192/113.3, 113.35

[56] References Cited

U.S. PATENT DOCUMENTS

| | | | |
|---|---|---|---|
| 3,819,020 | 6/1974 | Smith | 192/113.35 |
| 3,900,089 | 8/1975 | Ivey | 192/85 |
| 3,924,712 | 12/1975 | Stirling et al. | 188/264 F |
| 4,207,968 | 6/1980 | Chamberlain | 188/71.4 |
| 4,267,903 | 5/1981 | Kita et al. | 188/72.6 |
| 4,271,937 | 6/1981 | Hatch et al. | 192/113.35 |
| 4,324,320 | 4/1982 | Spurlin et al. | 188/71.6 |
| 4,325,471 | 4/1982 | Schuster | 192/85 |
| 4,442,929 | 4/1984 | Uchida | 192/52 |
| 4,624,353 | 11/1986 | Sailer et al. | 188/264 D |
| 4,644,968 | 2/1987 | Chatterjea | 137/599.2 |

FOREIGN PATENT DOCUMENTS

| 4128018 | 2/1993 | Germany | 188/264 D |
|---|---|---|---|

*Primary Examiner*—Robert J. Oberleitner
*Assistant Examiner*—Chris Schwartz
*Attorney, Agent, or Firm*—Claude F. White

[57] ABSTRACT

A brake assembly, having a plurality of co-operating rotating and non-rotating brake discs, includes a dump valve mechanism, including a spool valve. The spool valve is adapted to move between first and second positions to close and open fluid communications between a fluid supply passage and a fluid dump passage. Excess cooling fluid supplied to a brake assembly when the brakes are inactive causes "brake drag" which wastes power and decreases machine efficiency. By dumping the cooling fluid to a fluid dump passage when the brakes are inactive, the "brake drag" is reduced.

10 Claims, 2 Drawing Sheets

5,469,943

BRAKE ASSEMBLY HAVING A DUMP VALVE

TECHNICAL FIELD

This invention relates generally to multiple disc brake assemblies and more particularly to such an assembly having a movable spool dump valve mechanism.

BACKGROUND ART

Earthmoving and construction machines, such as track-type tractors, utilize multiple disc steering clutches and brake assemblies for steering and braking the machine. These multiple disc assemblies include a plurality of rotatable and complimentary non-rotatable discs which contact each other when the machine is in operation and or is being braked. A large quantity of fluid is supplied to these disc assemblies for lubrication and cooling. During a braking operation, when the rotating discs contact the non-rotating discs, considerable heat is generated from the frictional engagement of the brake discs. A large quantity of fluid is directed to the brake discs to cool the discs and prevent warping and damage.

When the brakes are released and the rotating discs separate from the non-rotating discs, the lubricating and cooling fluid is normally continuously supplied to the brake assembly. This produces what is generally referred to as "brake drag" and is a result of large amounts of cooling fluid meeting with the rotating brake discs. This "brake drag" decreases the overall efficiency of the machine and subtracts from the power transmitted between the engine and tracks of the vehicle. Extra oil being pumped through the brakes also reduces efficiency by taking more engine power to drive the oil pump.

The present invention is directed to overcoming one or more of the problems as set forth above.

DISCLOSURE OF THE INVENTION

In one aspect of the present invention, a brake assembly having a dump valve mechanism includes a multiple disc brake pack, rotatable and non-rotatable housings, a brake piston contained within the non-rotatable housing, and a dump valve mechanism including a movable spool valve. The spool valve is adapted to control flow of lubricating and cooling fluid from a fluid supply passage to the brake assembly. By reducing the large volume of fluid flow to the brake assembly when the brakes are inactive, overall tractor efficiency is increased due to the reduction in "brake drag". Machine fuel consumption is reduced and additional power is available to perform work functions.

BEST MODE FOR CARRYING OUT THE INVENTION

Figure 1:
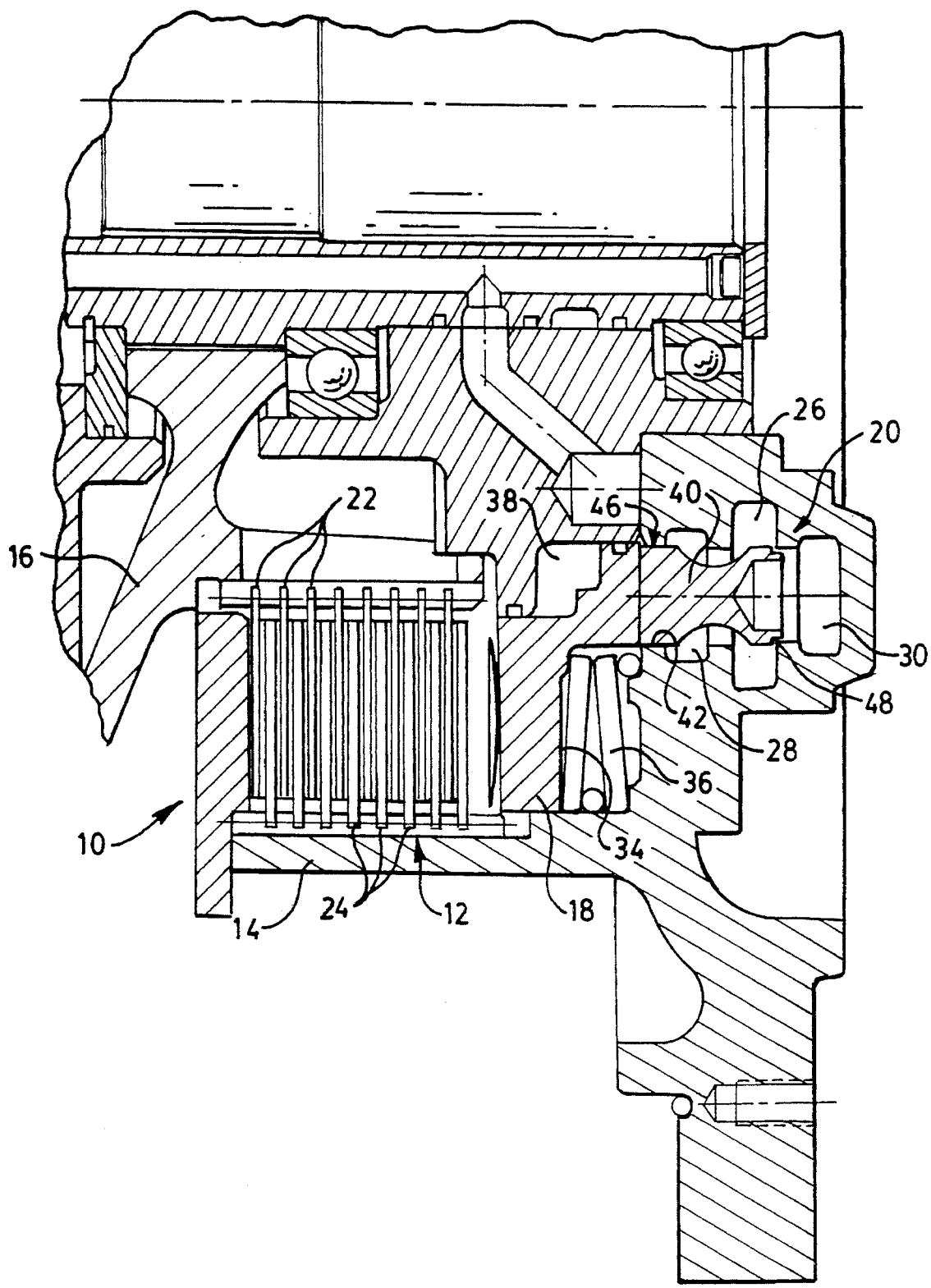
FIG. 1 is a diagrammatic cross-sectional view of a portion of a disc brake assembly with the brakes inactive and illustrating the subject invention.
Figure 2:
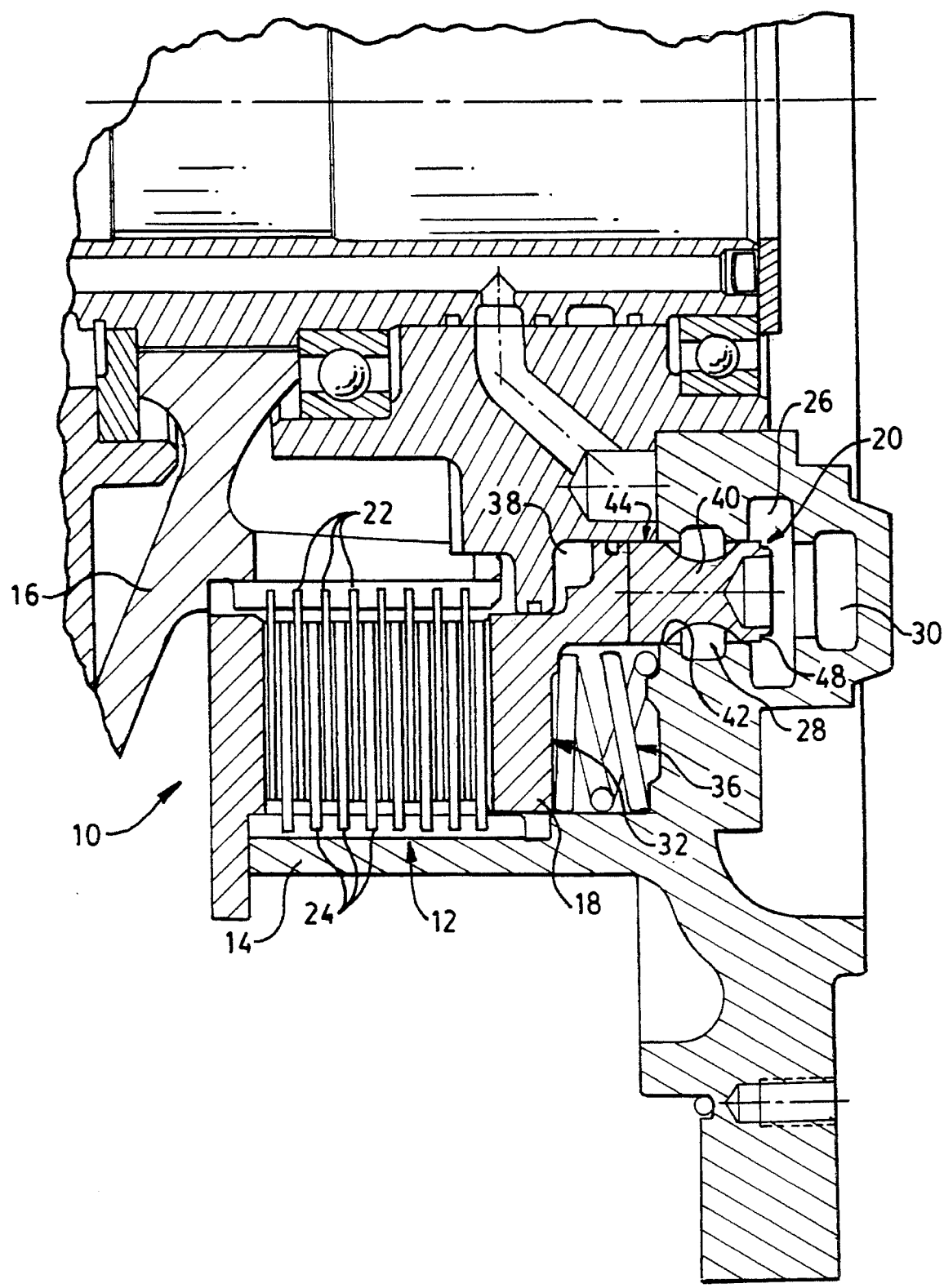
FIG. 2 is a diagrammatic cross-sectional view similar to FIG. 1 with the brakes activated and illustrating the subject invention.

With reference to the drawings, a brake assembly 10 includes a multiple disc brake pack 12, a first non-rotatable housing 14, a second rotatable housing 16, a brake piston 18, and a dump valve mechanism 20. The brake pack 12 has a plurality of rotatable brake discs 22 and a plurality of co-operating non-rotatable discs 24. The rotatable discs 22 are connected to the rotatable housing 16 and the non-rotatable discs 24 are connected to the non-rotatable housing 14. The non-rotatable housing 14 defines a plurality of passages including a fluid supply passage 26, a fluid dump passage 28, and a fluid brake flow passage 30. The passages 26,28, and 30 are formed within the non-rotatable housing 14 by a casting process which eliminates additional machining operations.

The brake piston 18 is positioned within the non-rotatable housing 14 and is adapted to move between first and second positions 32,34. In the first position 32 of the brake piston 18, the rotatable discs 22 are in contact with the non-rotatable discs 24 and the brakes are applied. In the second position 34 of the brake piston 18, the rotatable discs 22 are spaced from the non-rotatable discs 24 and the brakes are released. A spring device 36 is adapted to move the brake piston 18 from the second position 34 to the first position 32. The non-rotatable housing 14 and the brake piston 18 further define a substantially closed chamber 38 and a supply of pressurized fluid introduced into the chamber 38 is adapted to move the brake piston 18 from the first position 32 to the second position 34. The spring device 36 will move the piston 18 only in the absence of pressurized fluid in the chamber 38.

The dump valve mechanism 20 includes a spool valve 40 positioned within a bore 42 in the non-rotatable housing 14. The spool valve 40 is associated with the brake piston 18 and is adapted to move between a first position 44 and a second position 46. In the first position 44, the spool valve 40 closes off fluid communication between the fluid supply passage 26 and the fluid dump passage 28 and opens the fluid supply passage 26 to the fluid brake flow passage 30 for substantially unrestricted fluid communication to the brake assembly 10. In the second position 46, the spool valve 40 opens fluid communication between the fluid supply passage 26 and the fluid dump passage 28. In the second position 46 of the spool valve 40, the fluid brake flow passage 30 is substantially closed to fluid communication from the fluid supply passage 26. However, the spool valve 40 has a relief area or orifice 48 through which a predetermined amount of fluid can flow from the fluid supply passage 26 to the fluid brake flow passage 30 when the spool valve 40 is in the second position 46. This small amount of fluid flowing through the orifice 48 is sufficient to lubricate the brake pack 12 when the brakes are inactive and substantially no heat is being generated. The first and second positions 42,46 of the spool valve 40 corresponds substantially with the first and second positions 32,34 respectively of the brake piston 18. The spool valve 40 is moved from the first position 44 to the second position 46 by the brake piston 18, and is moved from the second position 46 to the first position 44 by the pressurized fluid in the fluid supply passage 26. To ensure that the spool valve 40 moves with the brake piston 18 from the second position 46 to the first position 44, a spring can be positioned behind the spool valve 40.

Industrial Applicability

With reference to the drawings, and the previous detailed description, the subject brake assembly 10 and dump valve mechanism 20 are particularly useful in earthmoving and construction machines which utilize multiple disc steering clutches and brakes. A brake assembly 10 for such a machine includes a plurality of co-operating rotating and non-rotating brake discs 22,24. During a braking operation, the discs 22,24 contact each other to cause a braking action for the machine. Frictional contact between the discs 22,24 generates heat which must be dissipated to prevent damage to the brake discs 22,24. Large amount of cooling and lubricating fluid are provided to the brake pack 12 from the fluid supply passage 26 to the fluid brake flow passage 30, which is in direct communication with the brake assembly 10. However, when the brakes are released and the rotating discs 22 separate from the non-rotating discs 24, little or no heat is being generated and the large amount of cooling fluid is unnecessary. If the large amount of fluid continues to the brake assembly, considerable power and energy is used up in "brake drag".

To reduce this "brake drag", the spool valve 40 moves from the first position 44 to the second position 46 when the brakes are released. This movement of the spool valve 40 substantially closes off fluid flow to the fluid brake flow passage 30 and opens fluid communication between the fluid supply passage 26 and the fluid dump passage 28. This by-pass fluid can be directed to the machine power train oil tank or used in other areas of the machine. The efficiency of the machine is increased and fuel consumption is decreased when the "brake drag" is reduced.

Other aspects, objects and advantages of this invention can be obtained from a study of the drawings, the disclosure and the appended claims.

We claim:

1. A brake assembly, comprising:

a multiple disc brake pack having a plurality of rotatable brake discs and a plurality of co-operating non-rotatable brake discs;

a non-rotatable housing defining a fluid supply passage and a fluid dump passage, said non-rotatable brake discs being connected to said non-rotatable housing;

a rotatable housing, said rotatable brake discs being connected to said rotatable housing;

a brake piston, contained within said non-rotatable housing and being adapted to move between a first position wherein said non-rotatable discs are in contact with said rotatable discs and a second position wherein said rotatable discs are spaced from said non-rotatable discs; and a dump valve mechanism including a spool valve in contact with said brake piston, said spool valve being adapted to move between a first position wherein fluid communication between said fluid supply passage and said fluid dump passage is closed, and a second position wherein fluid communication between said fluid supply passage and said fluid dump passage is open, said valve mechanism moving in the same direction as said piston during movement between said first and second positions of said valve mechanism and said piston.

2. A brake assembly, as set forth in claim 1, wherein said non-rotatable housing further defines a fluid brake flow passage, said passage being in substantially unrestricted fluid communication with said fluid supply passage when said spool valve is in said first position.

3. A brake assembly, as set forth in claim 1, wherein said non-rotatable housing further defines a fluid brake flow passage, said passage being substantially closed to fluid communication from said fluid supply passage when said spool valve is in said second position.

4. A brake assembly, as set forth in claim 1, wherein said first and second positions of said spool valve corresponds substantially with said first and second positions of said brake piston.

5. A brake assembly, as set forth in claim 1, wherein said non-rotatable housing further defines a fluid brake flow passage and said spool valve defines an orifice through which a predetermined amount of fluid may flow from said fluid supply passage to said fluid brake flow passage when said spool valve is in said second position.

6. A brake assembly, as set forth in claim 3, wherein said spool valve defines an orifice, said orifice providing passage of a predetermined amount of fluid flow from said fluid supply passage to said fluid brake flow passage when said spool valve is in said second position.

7. A brake assembly, as set forth in claim 1, including a spring device, said device being adapted to move said brake piston from said second position to said first position.

8. A brake mechanism, as set forth in claim 1, including a supply of pressurized fluid and a substantially closed chamber for receiving said pressurized fluid, said fluid and said chamber co-operating to move said brake piston from said first position to said second position.

9. A brake assembly, as set forth in claim 1, wherein said non-rotatable housing further defines a fluid brake flow passage, said fluid supply passage, said fluid dump passage, and said fluid brake flow passage being formed within said housing by a casting process.

10. A dump valve mechanism, comprising:

a brake assembly having a plurality of rotatable brake discs and a plurality of co-operating non-rotatable brake discs;

a first housing defining a fluid supply passage, a fluid brake flow passage, and a fluid dump passage, said non-rotatable brake discs being connected to said first housing;

a second housing, said rotatable brake discs being connected to said second housing;

a brake piston positioned within said first housing and being adapted to move between a first actuated position with said non-rotatable discs in contact with said rotatable discs and a second non-actuated position with said rotatable discs spaced from said non-rotatable discs;

a spool valve in contact with said brake piston, said spool valve being adapted to move between a first position wherein fluid communication between said fluid supply passage and said fluid dump passage is closed, and a second position wherein fluid communication between said fluid supply passage and said fluid dump passage is open, said valve mechanism moving in the same direction as said piston during movement between said first and second positions of said valve mechanism and said piston, said fluid supply passage being in substantially unrestricted fluid communication with said fluid brake flow passage with said spool valve in said first position.

* * * * *

UNITED STATES PATENT AND TRADEMARK OFFICE
CERTIFICATE OF CORRECTION

PATENT NO. : 5,469,943
DATED : November 28, 1995
INVENTOR(S) : John H. Hill, et. al.

It is certified that error appears in the above-indentified patent and that said Letters Patent is hereby corrected as shown below:

Title page, item [21], Application No. insert--08/431,699--.

Signed and Sealed this

Ninth Day of April, 1996

Attest:

BRUCE LEHMAN

Attesting Officer

Commissioner of Patents and Trademarks